(12) United States Patent
Abrudan et al.

(10) Patent No.: US 12,072,429 B2
(45) Date of Patent: Aug. 27, 2024

(54) LOCATION ESTIMATION

(71) Applicant: Nokia Solutions and Networks Oy, Espoo (FI)

(72) Inventors: Traian Abrudan, Espoo (FI); Holger Claussen, Dublin (IE); Veli-Matti Kolmonen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 513 days.

(21) Appl. No.: 17/283,709

(22) PCT Filed: Oct. 9, 2018

(86) PCT No.: PCT/EP2018/077501
§ 371 (c)(1),
(2) Date: Apr. 8, 2021

(87) PCT Pub. No.: WO2020/074071
PCT Pub. Date: Apr. 16, 2020

(65) Prior Publication Data
US 2021/0389409 A1 Dec. 16, 2021

(51) Int. Cl.
*G01S 5/02* (2010.01)
*G01S 5/04* (2006.01)

(52) U.S. Cl.
CPC .............. *G01S 5/0278* (2013.01); *G01S 5/04* (2013.01)

(58) Field of Classification Search
CPC ............ G01S 5/04; G01S 5/0278; G01S 3/14; G01S 3/46
See application file for complete search history.

(56) References Cited

U.S. PATENT DOCUMENTS 6,456,956 B1* 9/2002 Xiong .................. G01S 5/0218
 702/94
8,175,851 B1* 5/2012 Francis .................... G01S 3/46
 702/199

FOREIGN PATENT DOCUMENTS

PT 108735 B 11/2019
WO 2013/179195 A1 12/2013
(Continued)

OTHER PUBLICATIONS

Garcia-Fernandez et al ("Gaussian Tracking With Kent-Distributed Direction of Arrival Measurements"). IEEE Trans.on Vehicular Technology, vol. 70, No. 7, Jul. 2021.pp. 7249-7254. (Year: 2021).*

(Continued)

*Primary Examiner* — Vladimir Magloire
*Assistant Examiner* — Nazra Nur Waheed
(74) *Attorney, Agent, or Firm* — Harrington & Smith (57) ABSTRACT

This specification relates to estimation of a location of a mobile device using one or more locator devices. This specification describes an apparatus comprising: means for receiving, from one or more locator devices, each locator device comprising an antenna array, information indicative of a bearing from the antenna array of each of the one or more locator devices to a mobile device; means for determining parameters of a Kent distribution for each of the one or more locator devices based on the received information and predetermined characteristics of the antenna array; and means for determining an estimated position of the mobile device by performing an optimisation process on an objective function that is dependent on the Kent distribution parameters for each of the one or more locator devices.

18 Claims, 7 Drawing Sheets

(56) References Cited

FOREIGN PATENT DOCUMENTS

| WO | 2014/087196 A1 | 6/2014 |
|---|---|---|
| WO | 2014/087197 A1 | 6/2014 |
| WO | 2014/087198 A1 | 6/2014 |
| WO | 2014/087199 A1 | 6/2014 |
| WO | 2014/107869 A1 | 7/2014 |
| WO | 2014/108753 A1 | 7/2014 |
| WO | 2015/013904 A1 | 2/2015 |
| WO | 2020/074070 A1 | 4/2020 |

OTHER PUBLICATIONS

Pages-Zamora et al., "Closed-form Solution for Positioning Based on Angle of Arrival Measurements", The 13th IEEE International Symposium on Personal, Indoor and Mobile Radio Communications, Sep. 18, 2002, pp. 1522-1526.

Kurras et al., "Direction of Arrival Based Positioning in Three Dimensional Coordinates", WSA 2017; 21th International ITG Workshop on Smart Antennas, Mar. 15-17, 2017, pp. 122-128.

Toloei et al., "State Estimation for Target Tracking Problems with Nonlinear Kalman Filter Algorithms", International Journal of Computer Applications, vol. 98, No. 17, Jul. 2014, pp. 30-36.

Bnilam et al., "Adaptive Probabilistic Model Using Angle of Arrival Estimation for IoT Indoor Localization", Conference: International Conference on Indoor Positioning and Indoor Navigation IPIN2017, Sep. 2017, 7 pages.

Nurminen et al., "3-D Angle-of-Arrival Positioning using Von Mises-Fisher Distribution", arXiv, Sep. 7, 2017, 5 pages.

Kurz et al., "Unscented von Mises-Fisher Filtering", IEEE Signal Processing Letters, vol. 23, No. 4, Apr. 2016, pp. 463-467.

Abrudan et al., "Underground Incrementally Deployed Magneto-Inductive 3-D Positioning Network", IEEE Transactions on Geoscience and Remote Sensing, vol. 54, No. 8, Aug. 2016, pp. 4376-4391.

Jachimczyk et al., "Customization of UWB 3D-RTLS Based on the New Uncertainty Model of the AOA Ranging Technique", Sensors, vol. 17, No. 2, 2017, pp. 1-26.

Mendrzik et al., "Joint Localization and Mapping Through Millimeter Wave MIMO in 5G Systems—Extended Version" arXiv, Apr. 12, 2018, 13 pages.

Ham, "Real Time Localization of Assets in Hospitals Using QUUPPA Indoor Positioning Technology", Thesis, Nov. 3, 2015, 112 pages.

Ballal et al., "3D Location and Orientation Estimation Using Angle of Arrival", 6th IEEE International Symposium on Intelligent Signal Processing (WISP), Aug. 28, 2009, 7 pages.

Alem et al., "Spherical Harmonic Expansion of Fisher-bingham Distribution and 3d Spatial Fading Correlation for Multiple-antenna Systems" IEEE Transactions on Vehicular Technology Submission, Jan. 19, 2015, pp. 1-9.

International Search Report and Written Opinion received for corresponding Patent Cooperation Treaty Application No. PCT/EP2018/077501, dated Jul. 15, 2019, 12 pages.

Crouse, "Bearings-Only Localization Using Direction Cosines", 19th International Conference on Information Fusion (FUSION), Jul. 5-8, 2016, 8 pages.

Arora et al., "Minimizing Bearing Bias in Tracking by De-coupled Rotation and Translation Estimates", 14th International Conference on Information Fusion, Jul. 5-8, 2011, 8 pages.

Mammasis et al., "The Fisher-Bingham Spatial Correlation Model for Multielement Antenna Systems", IEEE Transactions on Vehicular Technology, vol. 58, No. 5, Jun. 2009, pp. 2130-2136.

Christou, "Beamforming Spatially Spread Signals with the Kent Distribution", 11th International Conference on Information Fusion, Jun. 30-Jul. 3, 2008, 7 pages.

\* cited by examiner

LOCATION ESTIMATION

RELATED APPLICATION

This application is the National Stage of, and therefore claims the benefit of, International Application No. PCT/EP2018/077501, filed on Oct. 9, 2018, the content of which is incorporated herein by reference in its entirety.

FIELD

This specification relates to estimation of a location of a mobile device using one or more locator devices.

BACKGROUND

There are a number of known techniques for determining the position of an apparatus using radio frequency signals. Some popular techniques relate to use of the Global Positioning System (GPS), in which multiple satellites orbiting Earth transmit radio frequency signals that enable a GPS receiver to determine its position. However, GPS is often not very effective in determining an accurate position indoors.

Some non-GPS positioning techniques enable an apparatus to determine its position indoors. However, many of these techniques do not result in an accurate position being determined, and others suffer from other disadvantages.

SUMMARY

In a first aspect, this specification describes apparatus comprising: means for receiving, from one or more locator devices, each locator device comprising an antenna array, information indicative of a bearing from the antenna array of each of the one or more locator devices to a mobile device; means for determining parameters of a Kent distribution for each of the one or more locator devices based on the received information and predetermined characteristics of the antenna array; and means for determining an estimated position of the mobile device by performing an optimisation process on an objective function that is dependent on the Kent distribution parameters for each of the one or more locator devices.

The one or more locator devices may comprise a plurality of locator devices.

The apparatus may further comprise means for determining an initial estimated position using an iterative reweighted least squares method to initialise the optimisation process performed on the likelihood function.

A previous estimated position of the mobile device may be used to initialise the optimisation process performed on the objective function.

The optimisation process may comprise optimising the objective function to within a predetermined threshold. The optimisation process may comprise performing one or more of: a search process, a gradient search process or grid search process on the objective function.

The predetermined characteristics may describe the aperture size of the antenna array.

The apparatus may further comprise means for determining an estimated error for the estimated position of the user device, wherein the estimated error is determined based on the local curvature of the objective function.

The apparatus may further comprise means for performing outlier filtering on the estimated position of the user device to determine a filtered estimated position of the user device. Means for performing outlier filtering may comprise: means for determining whether a difference between the estimated position of the user device and a previous estimated position of the user device is below a threshold distance; and means for setting the filtered position using Bayesian filtering in response to a positive determination. The means for performing outlier filtering may further comprise: means for, in response to a negative determination, re-computing an initial estimate of the user device location and setting the filtered estimated position of the user device to the initial estimated position of the user device.

The objective function may comprise a joint likelihood function, a log-likelihood function, or an a posteriori probability density function of the Kent distribution for each of the one or more locator devices.

Information indicative of a bearing from the antenna array of each of the one or more locator devices to the mobile device may comprise a unit vector directed from the locator device to the mobile device.

In a second aspect, this specification describes a method comprising: receiving, from one or more locator devices, each locator device comprising an antenna array, information indicative of a bearing from the antenna array of each of the one or more locator devices to a mobile device; determining parameters of a Kent distribution for each of the one or more locator devices based on the received information and predetermined characteristics of the antenna array; and determining an estimated position of the mobile device by performing an optimisation process on an objective function that is dependent on the Kent distribution parameters for each of the one or more locator devices.

The one or more locator devices may comprise a plurality of locator devices.

The method may further comprise determining an initial estimated position using an iterative reweighted least squares method to initialise the optimisation process performed on the objective function.

A previous estimated position of the mobile device may be used to initialise the optimisation process performed on the objective function.

The optimisation process may comprise optimising the objective function to within a predetermined threshold.

The optimisation process may comprise performing one or more of: a search process, a gradient search process, or a grid search process on the objective function.

The predetermined characteristics of the antenna array may describe the aperture size of the antenna array.

The method may further comprise determining an estimated error for the estimated position of the user device, wherein the estimated error is determined based on the local curvature of the objective function.

The method may further comprise performing outlier filtering on the estimated position of the user device to determine a filtered estimated position of the user device. Performing outlier filtering comprises: determining whether a difference between the estimated position of the user device and a previous estimated position of the user device is below a threshold distance; and in response to a positive determination, determining the filtered position using Bayesian filtering. In response to a negative determination, the method may further comprise re-computing an initial estimate of the user device location and setting the filtered estimated position of the user device to the initial estimated position of the user device.

The objective function may comprise a joint likelihood function, a joint log-likelihood function, or an a posteriori probability density function of the Kent distribution for each of the one or more locator devices.

Information indicative of a bearing from the antenna array of each of the one or more locator devices to the mobile device may comprise a unit vector directed from the locator device to the mobile device.

In a third aspect, this specification describes apparatus comprising: one or more processors; a memory, wherein the memory includes instructions that, when executed by the one or more processors, causes the apparatus to perform a method comprising: receiving, from one or more locator devices, each locator device comprising an antenna array, information indicative of a bearing from the antenna array of each of the one or more locator devices to a mobile device; determining parameters of a Kent distribution for each of the one or more locator devices based on the received information and predetermined characteristics of the antenna array; and determining an estimated position of the mobile device by performing an optimisation process on an objective function that is dependent on the Kent distribution parameters for each of the one or more locator devices.

In a fourth aspect, this specification describes a system comprising: one or more locator devices; one or more mobile devices; and apparatus comprising one or more processors and a memory, wherein the memory includes instructions that, when executed by the one or more processors, causes the apparatus to perform a method comprising: receiving, from one or more locator devices, each locator device comprising an antenna array, information indicative of a bearing from the antenna array of each of the one or more locator devices to a mobile device; determining parameters of a Kent distribution for each of the one or more locator devices based on the received information and predetermined characteristics of the antenna array; and determining an estimated position of the mobile device by performing an optimisation process on an objective function that is dependent on the Kent distribution parameters for each of the one or more locator devices.

In a fifth aspect, this specification describes a non-transitory computer readable medium comprising program instructions for causing an apparatus to perform at least the following: receiving, from one or more locator devices, each locator device comprising an antenna array, information indicative of a bearing from the antenna array of each of the one or more locator devices to a mobile device; determining parameters of a Kent distribution for each of the one or more locator devices based on the received information and predetermined characteristics of the antenna array; and determining an estimated position of the mobile device by performing an optimisation process on an objective function that is dependent on the Kent distribution parameters for each of the one or more locator devices.

BRIEF DESCRIPTION OF THE FIGURES

Examples will now be described by way of non-limiting example with reference to the accompanying drawings, in which.

DETAILED DESCRIPTION

Various indoor localization technologies have been developed, with different accuracies and costs. For example, camera-based systems provide highly accurate localization, but they are subject to "blind spots", and are usually prohibitively expensive, and hence do not scale well. On the other hand, radio systems relying on existing communication infrastructure are usually very cost-effective solutions, but they only achieve accuracies of few meters. Common indoor radio positioning technologies rely on pairwise range estimates, differential ranges (time difference of arrival), angle of arrival (AoA) or angle of departure (AoD). Range estimates are obtained either from received signal strength (RSS) or time-of-arrival, such as in ultra-wideband (UWB) systems, whereas angles of arrival are estimated using antenna arrays. In general, the accuracy of these systems can be increased by adding more nodes, but typically UWB and AoA based systems provide much better accuracies than RSS based systems.

State-of-the-art indoor location detection methods exhibit at least cubic complexity in number of angular measurements because they employ costly matrix inversions or decompositions. In the case of particle filters, the complexity may be even larger because typically hundreds (or even thousands) of particles are required for a reasonable filter operation, especially when performing three dimensional localization. This dramatically decreases the number of users that can be simultaneously tracked by the system.

Figure 1:
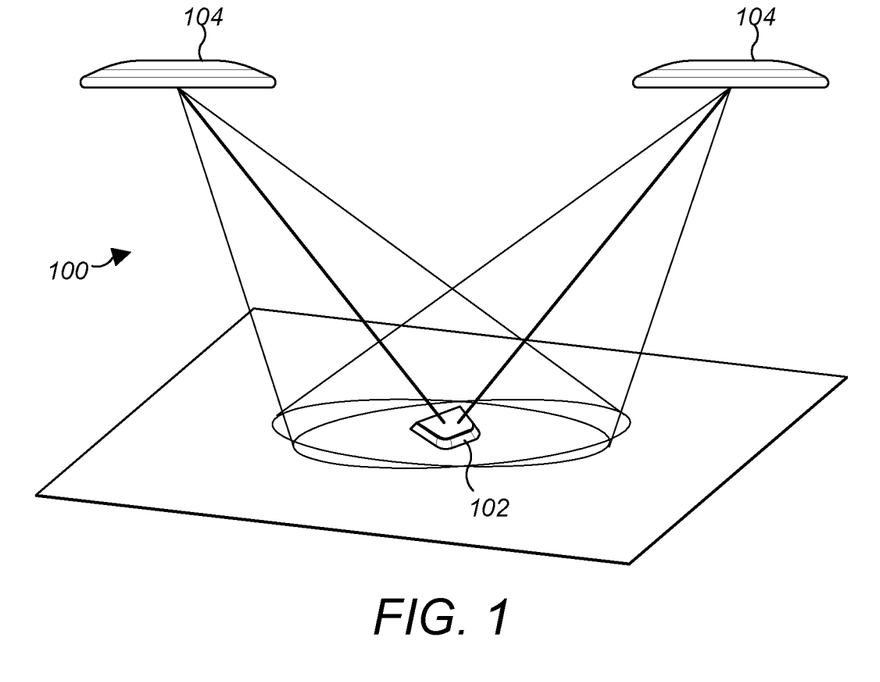
FIG. 1 shows an example of a system for location detection.
Figure 2:
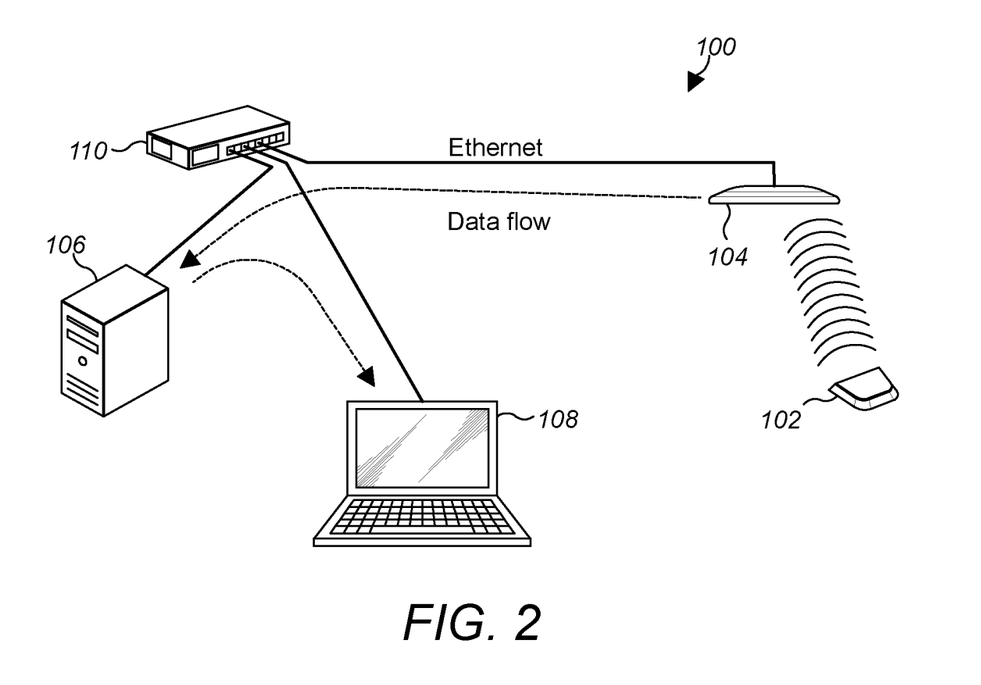
FIG. 2 shows a further example of a system for location detection.

FIGS. 1 and 2 show examples of systems for location estimation. The system 100 comprises one or more mobile devices 102 and one or more locator devices 104 positioned at one or more locations in an environment. The environment may be an indoor environment, such as a building interior. In some examples, such as the one shown in FIG. 2, the system 100 additionally comprises a positioning server 106 for processing data received from the one or more locator devices 104. The system 100 may also optionally comprise a client tool 108 for utilising/monitoring position estimates determined by the system 100 and a Power over Ethernet (PoE) switch 110 for routing signals and power through the system 100.

The one or more mobile devices 102 comprise a mobile communications device capable of transmitting and/or receiving electromagnetic signals. In some examples, the mobile devices 102 comprise one or more mobile radio communications apparatus that is operable to transmit radio signals that are receivable by the locator device 104, for instance Bluetooth Low Energy (BLE) protocol signals. The mobile devices may be, but are not limited to tags (such as BLE tags) low cost Internet-of-Things (IOT) devices, mobile phones (including smart phones), tablet computers, robots drones, or any other device equipped with a radio transceiver. The mobile devices 102 may also be referred to as trackable devices.

The one or more locator devices 104 each comprise an antenna array for receiving and/or transmitting signals. A locator device 104 may be in the form of a base station receiver apparatus. In the illustrated example, the locator devices 104 are positioned on the ceiling of a building (i.e. the overhead interior surface) but in other implementations the locator devices 104 may be placed elsewhere, such as on a wall or within an under-floor cavity. The locator devices 104 may also be referred to as positioning devices or positioning receivers. The locator devices 104 are for enabling the position of the mobile device 102 to be determined, although that is not necessarily the only function provided by the locator devices 104. For example, the locator devices 104 may be part of a transceiver for providing wireless internet access to users of apparatuses, for example, via wireless local area network (WLAN), Bluetooth Low Energy, or cellular radio signals. In the examples described in detail herein, each of the locator devices includes an antenna array via which radio signals may be transmitted and/or received.

The locator devices 104 are configured to receive packets from the one or more mobile devices 102 and to pass information derived from receipt of the packets to the positioning server apparatus 106. The positioning server apparatus 106 then uses this information to determine locations of the trackable devices 102 from which packets are received.

Throughout the following description, examples will be described with reference to radio signals. However, it will be appreciated that the systems, apparatus and methods described herein may be applied to any system that performs angular measurements to determine a position of a mobile device 102. For example, the systems, methods and apparatus described herein may equally be applied to optical systems using visible light or infrared cameras, microphone arrays, and/or hydrophone arrays.

Furthermore, throughout the following description, examples will be described with reference to an angle of arrival (AoA) based system, but may alternatively or additionally be applicable to an angle of departure (AoD) based system.

In the example shown, two locator devices 104 are shown but, in general, one locator device 104 or a plurality of locator devices 104 may be present in the system 100.

Briefly, the mobile device 102 is configured to transmit signals which are received at one or more of the locator devices 104 of the system 100. The locator devices 104 are each configured to process the received signals to determine information indicative of a bearing from the antenna array of the locator device 104 to the mobile device 102 (e.g. an angle-of-arrival, a unit vector pointing from the locator device 104 to the mobile device 102). In some examples, the signal captured at the locator devices 104 is divided into short packets and the information indicative of a bearing is determined on a per-packet basis. Calculation of the bearing may be performed by the locator devices 104, or externally to the locator devices 104. If bearing calculation is performed externally to the locator devices (e.g. at the positioning server 106), samples or part-processed samples of the received signals may be sent from the locator devices to a positioning server 106.

To estimate a two-dimensional position of a mobile device 102, a single locator device 103 will suffice, provided its three-dimensional position and orientation, as well as the three-dimensional position of the plane containing the mobile device 102 (or some other constraint) is known. For example, a user's height can be assumed to be known, hence the height of the horizontal plane containing the mobile device 102 can be estimated, and two-dimensional localization may be performed within this plane. The estimated location will be at the intersection of the estimated direction with the user's plane.

To estimate a three-dimensional position of the mobile device 102 from information indicative of a bearing from the antenna array of the locator device 104 to the mobile device 102 as well as known locator device 104 positions and orientations, at least two locators may be required. The location estimation may then be performed based on multiple angular estimates.

Each locator device has associated uncertainties in the directions of the signals that it receives. The uncertainties in estimated bearings from the antenna array of the locator device 104 to the mobile device 102 can be thought of as "fuzzy cones" that emanate from the corresponding antenna arrays of the locator devices 104. In nominal conditions, these cones point towards the true mobile device 102 position. If these fuzzy cones were thought of, by analogy, as cones of light, the user would be located at "the most illuminated location" defined by the superposition of these fuzzy cones. A maximum likelihood position estimate would be where the superposition of the fuzzy cones achieves the highest value, i.e., at the point where a joint likelihood function attains its maximum value.

In examples described herein, the uncertainty, in probabilistic terms, of each of the locator devices 104 may be modelled using a Kent distribution.

Figure 3:
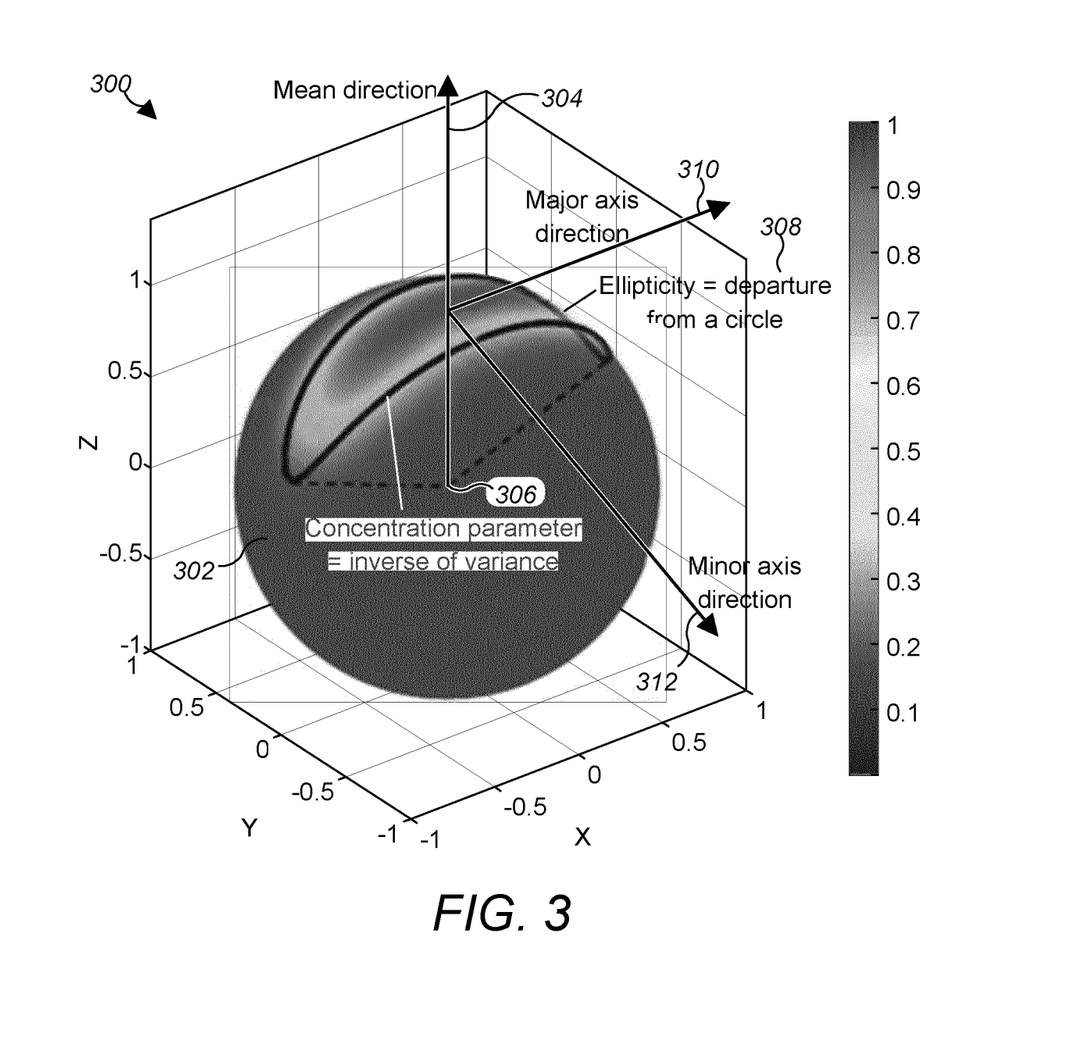
FIG. 3 shows an example of a Kent distribution.

FIG. 3 illustrates an example of a Kent distribution. A Kent distribution 300 is a probability distribution on a two-dimensional unit sphere 302. A Kent distribution 300 can produce elliptic fuzzy cone cross-sections with arbitrary ellipse eccentricity and orientation. It therefore provides full control over the ellipticity of the directional uncertainty.

A Kent distribution is characterised by a number of parameters:

a mean direction ($\mu$) 304, corresponding to the axis of symmetry of the distribution (i.e. the axis of symmetry of the cone). The mean direction is a three-dimensional vector. It may be a unit vector.

a concentration parameter ($\kappa$) 306, describing the spread of the distribution. This is analogous to the inverse of variance for a two-dimensional Gaussian probability density function. The concentration parameter is a scalar.

the ellipticity ($e \in [0, \kappa/2)$) 308 of the fuzzy cone transversal cross-section, which describes the departure of equal probability contours from a circle towards an elongated ellipse. This is similar to eccentricity. The contours are circular for $e=0$, and elliptical with maximum eccentricity for $e=\kappa/2$). The ellipticity is a scalar.

directions of the ellipse axes which define the orientation of the equal probability contours. The directions define a major axis (a) 310 and a minor axis (b) 312. These axes are mutually perpendicular, and each perpendicular to the mean direction 304. The directions of the ellipse axis are each three-dimensional vectors. They may be a unit vectors.

In terms of these parameters, the Kent distribution is defined as follows:

$$Kent(x;\mu;\kappa,e,a,b) = ce^{\kappa(\mu^T x) + e[(a^T x)^2 - (b^T x)^2]}, \quad (1)$$

where $x \in \mathbb{R}^3$ is a unit vector and c is a scalar normalisation constant. A benefit of using the Kent Distribution is that it addresses specific antenna array related imperfections a priori. An antenna array with a more uniform aperture size in most directions can be constructed, but those designs are either difficult to manufacture, or their form factor may not be very convenient (e.g. a spherical array is harder to integrate than a planar array). With this method, the coverage of certain types of antenna arrays, such as planar arrays which are easier to manufacture, can be significantly extended.

By modelling the antenna imperfections a priori, the coverage area of locator devices can be increased. Traditionally, planar arrays are considered to operate with about 45-degree maximum elevation angle, which limits the coverage area to a circle with radius of, for example, about 2.5 meters (assuming that the locators or are mounted on a low ceiling of ~2.5 meters, which is common, for instance, in office environments). Using the method as described herein, the elevation angle can be increased to approximately 80 degrees. This can extend the coverage area, for example, to a circle with radius of fourteen meters. As will be appreciated, the broader coverage cone of each locator device can lead to a lower deployment density of locator devices 104, which has a number of associated benefits (e.g. reduced manufacturing, reduced power consumption etc.).

Figure 4:
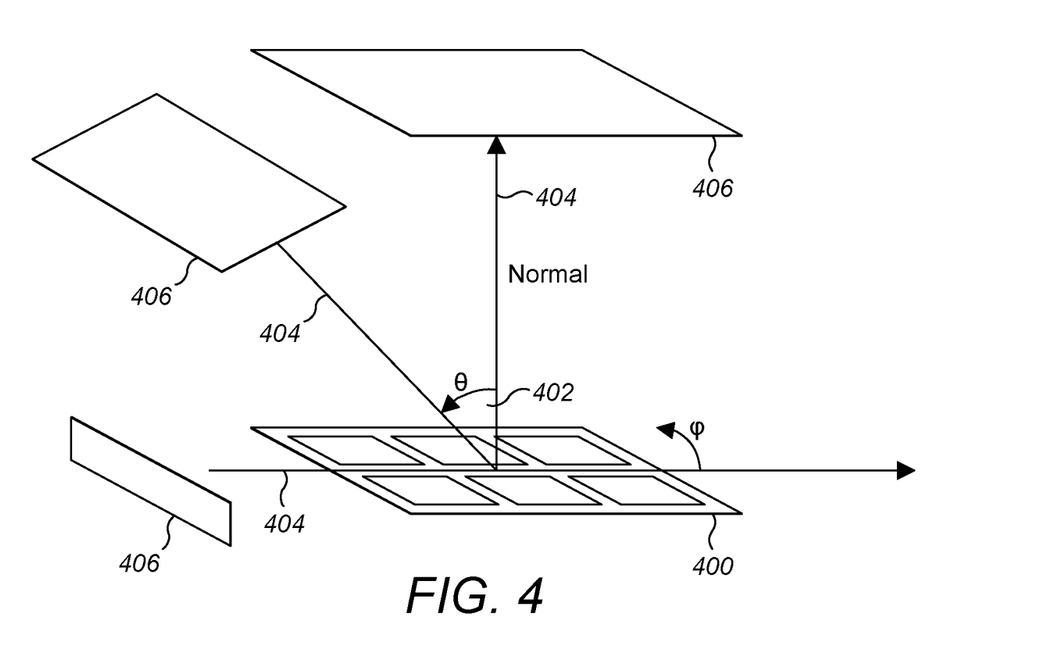
FIG. 4 shows an example of the aperture size of an antenna array at various angles.

As an example, consider a planar antenna array 400 as shown schematically in FIG. 4. A planar array 400 is designed to operate towards its normal direction. Once the elevation angle 402, θ, measured between the normal of the antenna surface and the incoming wave 404 increases, the projected size of the array aperture 406 gets smaller thus limiting the performance in the elevation domain. For this reason, traditionally the operation in the θ domain is limited for planar designs. In the azimuth direction ϕ, however, the projected size of the aperture 406 diminished much less, and some information can still be gathered from the measurements. This means, that the uncertainty in the θ and ϕ angles is not at all similar. By appropriately modelling these antenna-specific uncertainties using the Kent distribution as described herein, the usable angular domain can be increased. This can result in a broader coverage cone of the antenna, and ultimately, to a lower deployment density of locator device 104.

Figure 5:
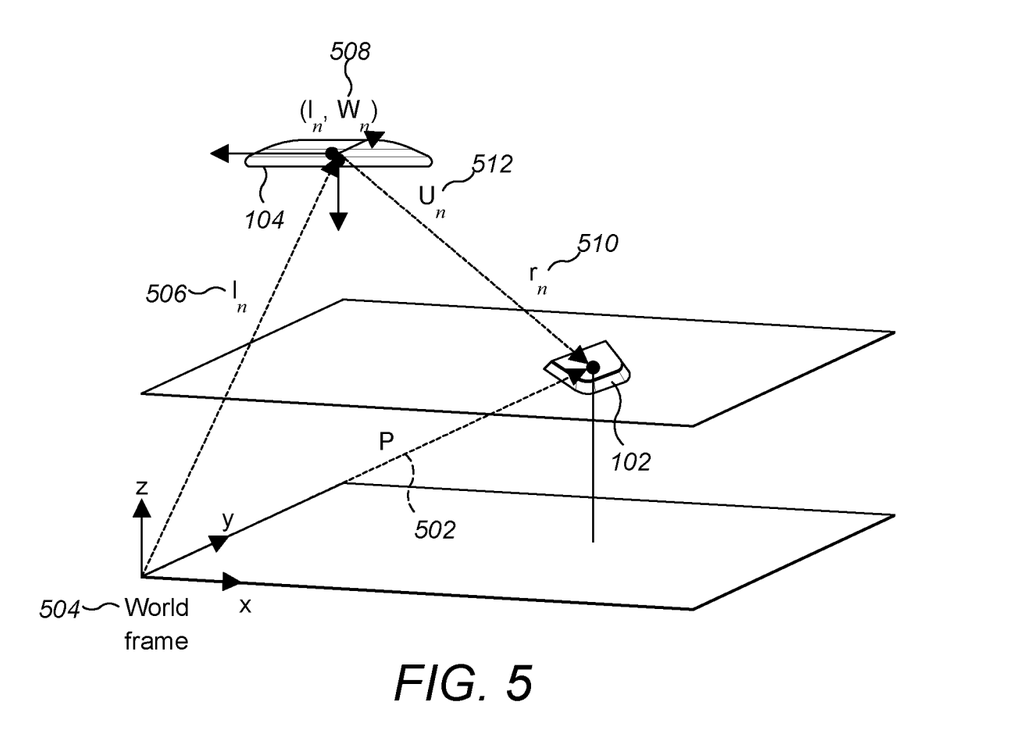
FIG. 5 shows an example of coordinate systems used by the location estimation system.

FIG. 5 shows an example of coordinate systems, which may be used by the location estimation system. A position, p, 502 of the mobile device is to be estimated in a particular reference frame, herein referred to as the "World frame" 504. The positions, $l_n$, 506 of each of the one or more locator devices 104 (indexed by n) in the World frame are known a priori. The orientations, $\Omega_n$, 508 of each of the one or more locator devices 104 in the World frame may also be known a priori. The positions 506 of the locator devices may, for example, each be given by a three-dimensional vector. The orientations 508 of the locator devices may, for example, each be given by a three-by-three orthogonal matrix. The location of the mobile device 102 relative to a locator device 104 in that locator device frame is denoted by the vector $r_n$ 510, with a unit vector in this direction denoted $u_n$ 512.

For each locator device 104, an equation that relates the true position of the mobile device 102 in the world frame 504 to position in the frame of that locator device is given by:

$$p = l_n + \rho_n \Omega_n u_n, \quad (2)$$

where $u_n$ is a unit vector in the nth locator device 104 frame pointing towards the mobile device 102, and $\rho_n$ is the range between the nth locator device 104 and the mobile device 102, and is equal to the magnitude of the vector $r_n$. Locator devices do not in general provide range information. The locator devices 104 provide an estimate of direction vectors $u_n$ based on estimated angles of arrival. Thus, the range $\rho_n$ is unknown in practice. Note that Equation 2 is a linear equation.

Figure 6:
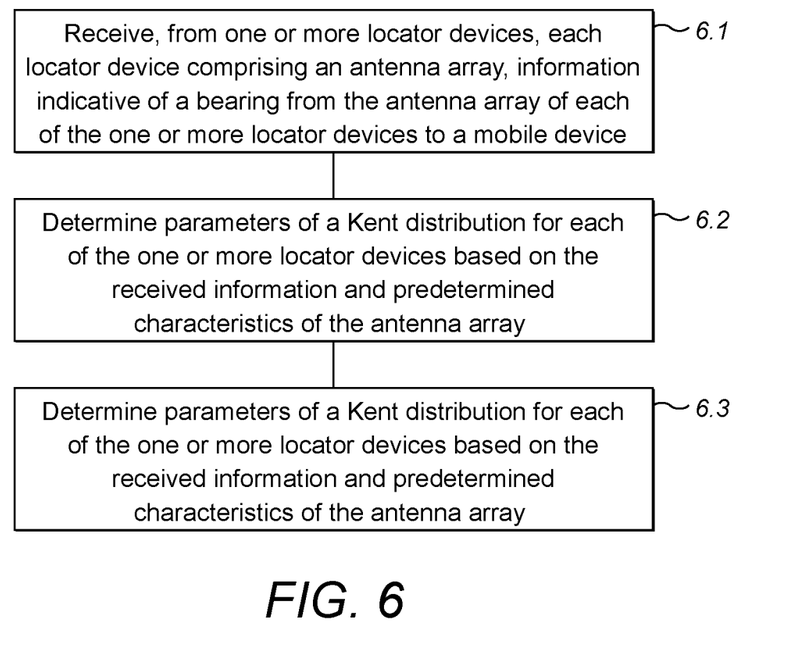
FIG. 6 shows a flow chart of a method for location estimation.

FIG. 6 illustrates an example of a method of estimating a mobile device location. The method can, for example, be performed by one or more elements of the system described above. In some examples, the method is performed by one or more of the locator devices 104 in the system 100. In other examples, the method is performed by a positioning server apparatus 106 in the system 100.

At operation 6.1, information indicative of a bearing from the antenna array of each of the one or more locator devices 104 to a mobile device 102 is received from one or more of the locator devices 104. The information indicative of the bearing from the antenna array of each of the one or more locator devices 104 to a mobile device 102 may, for example, be an estimate of a unit vector pointing from the locator device 104 to the mobile device 102, $\widehat{u_n}$. This estimate of the unit vector pointing from the locator device 104 to the mobile device 102 can be used as the mean direction in a Kent distribution modelling the locator device antenna 104.

At operation 6.2, parameters of a Kent distribution are determined for each of the one or more locator devices 104 based on the received information and predetermined characteristics of the antenna array of each of the locator devices. The antenna array characteristics may include the aperture size of the antenna array and/or the geometry of the antenna array (from which the aperture of the array may be calculated). Examples of antenna array geometry parameters may include, but are not limited to, the relative positions and/or orientations of antenna array elements, sizes of antenna array elements, number of antenna array elements, the shapes of antenna elements, polarisation of antenna and/or element types of the antenna. Some antenna geometry examples include: planar array, cylindrical array, hemispherical array, etc.

Estimated values of one or more of the Kent distribution parameters, $\widehat{\kappa_n}$, $\widehat{e_n}$, $\widehat{a_n}$, $\widehat{b_n}$, may be set by considering the antenna characteristics. In some examples, all of the parameters are determined. In other examples, one or more of the parameters may be fixed, with only a subset of the parameters being determined from the received information and predetermined characteristics of the antenna array of each of the locator devices. For arbitrary antenna array characteristics (e.g. geometry), the value of the Kent distribution parameters depend on the direction $\widehat{u_n}$ estimated at the nth locator:

$$[\widehat{\kappa_n}, \widehat{e_n}, \widehat{a_n}, \widehat{b_n}] = f_e(\widehat{u_n}) \quad (3)$$

where, $f_e(\widehat{u_n})$ is an antenna-specific function that returns the Kent distribution parameters: two scalars $\widehat{\kappa_n} \in [0, \infty)$ and $\widehat{e_n} \in [0, \widehat{\kappa_n}/2)$, and two orthogonal 3×1 unit vectors $\widehat{a_n}$, $\widehat{b_n}$ that are both orthogonal $\widehat{u_n}$. In general, the parameter $\widehat{\kappa_n}$ should increase monotonically (e.g. in the simplest case linearly), with the apparent array aperture as seen from direction $\widehat{u_n}$. Similarly, the parameter $\widehat{e_n}$ should penalize (e.g. in the simplest case increase linearly with) the departure of the apparent array aperture from a circle, as seen from direction $\widehat{u_n}$. The parameter $\widehat{a_n}$ should be the direction perpendicular to $\widehat{u_n}$ along which the apparent aperture reaches its maximum. The remaining parameter $\widehat{b_n}$ is chosen to be the direction perpendicular to both $\widehat{u_n}$ and $\widehat{a_n}$.

For example, for a planar antenna, the angular estimates degrade while increasing the true elevation angle (defined as angle w.r.t. the normal to the antenna plane), since the apparent aperture of the antenna array diminishes. Therefore, the concentration parameter $\widehat{\kappa_n}$ should decrease accordingly while departing from the normal direction of the antenna. Similarly, along the normal of a circularly symmetric the antenna, the eccentricity $\widehat{e_n}$ should be zero. While departing from the normal direction, the elevation angle estimates degrade much more than the azimuth angle estimates. Therefore, the ellipticity increases with the estimated elevation angle as well due to diminishing antenna aperture. The minor axis $\widehat{b_n}$ of the equal probability contours remains parallel to the antenna plane, and $\widehat{a_n}$ is uniquely defined by the mutual orthogonality constraint w.r.t both $\widehat{b_n}$, $\widehat{u_n}$.

Modelling the uncertainty parameters of the Kent distribution for a general antenna array may be performed as follows:
1. Determine the aperture size of the antenna array to multiple directions around the array. This may be performed using the known antenna array geometry.
2. Determine the domain of usable directions based on a predefined accepted minimum aperture.
3. Model the uncertainty parameters $\widehat{\kappa_n}$, $\widehat{e_n}$, $\widehat{a_n}$, $\widehat{b_n}$ of the Kent distribution in Equation (3) using the determined aperture size and the domain of usable directions.

It should be noted that all these operations may be performed before the system is taken into use. During run time, only the simple evaluation of using Equation (3) may be required. Since the Kent distribution uncertainty parameters are computed in a per-measurement basis, the method has a linear computational complexity.

At operation 6.3, an estimated position of the mobile device 102 is determined by performing an optimisation process on an objective function that is dependent on the Kent distribution uncertainty parameters determined for each of the one or more locator devices 104.

In some examples, the probabilistic localisation method maximizes an objective function in the form of a joint likelihood function corresponding to the one or more locator devices 104. For each locator device 104, the independent likelihood function is represented by a Kent distribution. In other examples, an a posteriori probability density function can be used as the objective function.

An example of a joint likelihood function is given by a log-likelihood function. The log-likelihood function of the position of the mobile device 102 corresponding to the nth locator device 104 is a "fuzzy cone" whose mean direction is the estimated direction $\hat{v}_n$ expressed in the World frame 404. The log-likelihood function can be written as:

$$\mathcal{L}_{Ln}(p) = \ln \text{Kent}\left(\frac{p - l_n}{\|p - l_n\|}; \hat{v}_n, \widehat{\kappa_n}, \widehat{e_n}, \hat{\alpha}_n, \hat{\beta}_n\right), \quad (4)$$
$$n = 1, \ldots, L$$

where $\hat{v}_n = \Omega_n \hat{u}_n$, $\hat{\alpha}_n = \Omega_n \hat{a}_n$ and $\hat{\beta}_n = \Omega_n \hat{b}_n$ represent the estimated position versor $\hat{u}_n$, and the ellipse axes $\widehat{a_n}$, $\widehat{b_n}$ at the nth locator, respectively, all translated into the World frame. The values of $\widehat{\kappa_n}$, $\widehat{e_n}$, $\widehat{a_n}$, $\widehat{b_n}$ are determined in operation 6.2. L is an integer corresponding to the number of locator devices 104 detecting the mobile device 102. Note that in general, a number N≥L estimated position vectors can be collected from the L locator devices, i.e., multiple measurements from each locator device, for instance as a consequence of direct and indirect propagation of the signal. Hence, in general, n denotes the index of a bearing measurement, and $l_n$ denotes the position of the locator device that produced the nth measurement. It will be appreciated that other examples of objective functions are possible.

Given N measurements from L locators, a joint log-likelihood function of the user's 3-D position may, for example, be given by:

$$\mathcal{L}_L(p) = \sum_{n=1}^{N} \mathcal{L}_{Ln}(p) = \text{constant} + \sum_{n=1}^{N}\left[\widehat{\kappa_n}\frac{i_{v_n}}{\rho_n} + \frac{\hat{e}_n}{\rho_n^2}(i_{a_n}^2 - i_{b_n}^2)\right], \quad (5)$$

where $i_{v_n} = r_n^T \hat{v}_n$, $i_{a_n} = r_n^T \hat{\alpha}_n$, $i_{b_n} = r_n^T \hat{\beta}_n$, with $r_n = p - l_n$, for $n = 1, \ldots, N$. This likelihood function undergoes an optimisation process in order to determine the estimated location of the mobile device 102. The optimisation process may proceed until one or more convergence criteria are met. For example, a convergence criterion may comprise the condition that the likelihood function is optimised to within a threshold value. Alternatively or additionally, the optimisation process may run for a predefined number of steps/iterations. The optimisation process may be iterative.

An example of an optimisation process that may be used in the method is a gradient ascent process. A gradient ascent process iteratively maximises the objective function. Starting from an initial value for the estimated position, an updated estimated position is iteratively determined using:

$$\widehat{p_{k+1}} = \widehat{p_k} + \alpha \nabla \mathcal{L}_L(\widehat{p_k}), \quad (6)$$

where k labels the iteration number and $\alpha$ is a scalar "step size". The gradient expression for the example objective function given by Equation 5 is given by:

$$\nabla \mathcal{L}_L(p) = \sum_{n=1}^{N}\left\{\left[\widehat{\kappa_n}\left(\frac{1}{\rho_n}\hat{v}_n - \frac{i_{v_n}}{\rho_n^3}r_n\right)\right] + 2e_n\left[\frac{1}{\rho_n^2}(i_{a_n}\hat{\alpha}_n - i_{b_n}\hat{\beta}_n) - \frac{1}{\rho_n^4}(i_{a_n}^2 - i_{b_n}^2)r_n\right]\right\}. \quad (7)$$

The gradient ascent process is iterated until one or more convergence criteria are met. The determined estimated position may then be output. The determined estimated position may be output for further processing or refinement by other systems and/or methods. In general, any search process can be used to substantially optimise the objective function. For example, a gradient search process (such as the gradient ascent process described above, or a gradient descent process for embodiments where an objective function is to be minimised) or a grid search process can be used.

The use of a log-likelihood function of a Kent distribution in the optimisation can result in reduced computational complexity, for example resulting in a linear-complexity optimisation process. For example, computation of the gradient in Eqn. (7) only involves inner products and scalar-vector multiplications, and hence the computational complexity of the method is linear in number of measurements. This can allow more simultaneous measurements to be included in the position computation. This can significantly increases the accuracy of the location detection. It may also increase the scalability of the location detection with respect to the number of users being tracked simultaneously.

Figure 7:
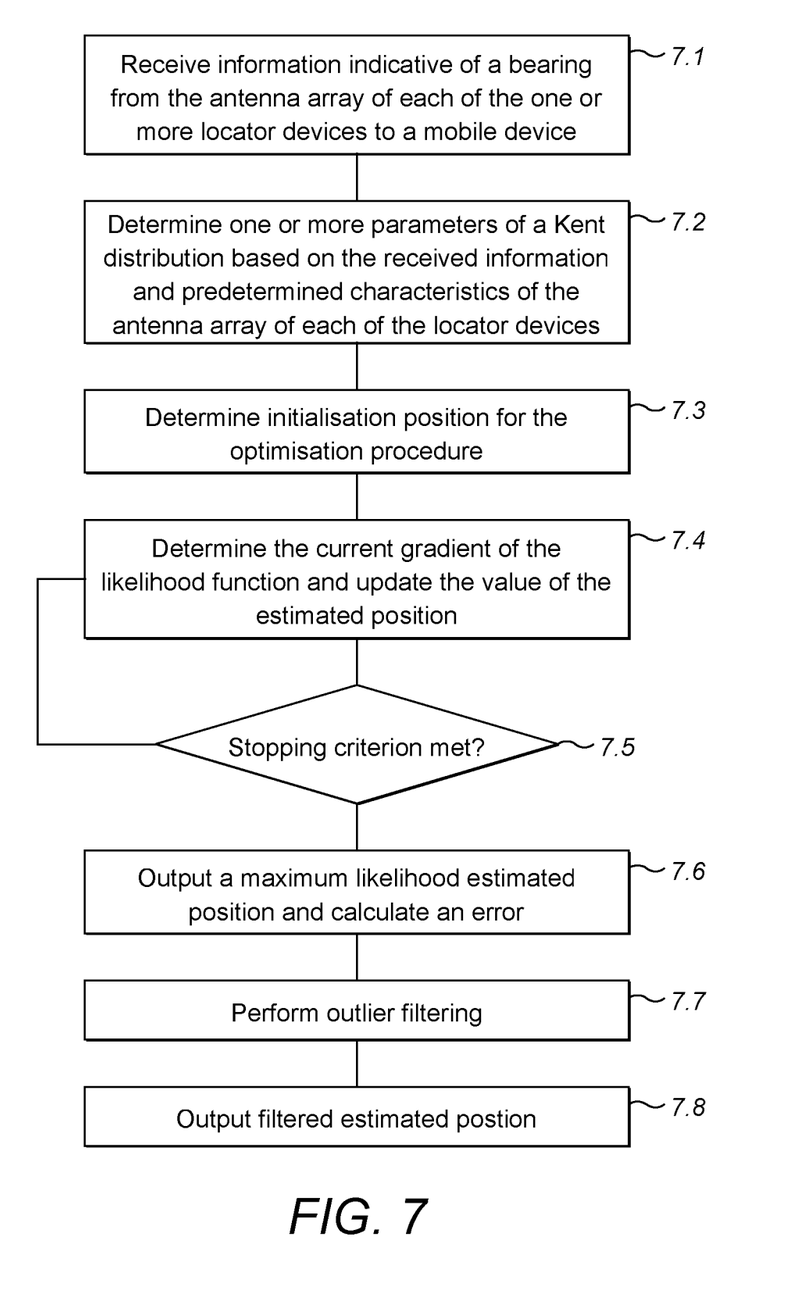
FIG. 7 shows a flow chart of a further method for location estimation.

The position estimation method described in relation to FIG. 6 can be combined with one or more post-filtering methods. This can allow the accuracy of the estimated position to be increased. An example of such a combination is shown in FIG. 7. In this example, the method is combined with an outlier filter. It will be appreciated that other post-filtering methods may alternatively or additionally be applied. FIG. 7 is also described in the context of a gradient ascent optimisation process, but it will be appreciated that other optimisation process can alternatively be used.

In order to filter the subsequent position estimates, in some examples a classical Kalman filter is employed whose state consists of the two-dimensional or three-dimensional position vector of the mobile device 102 and a corresponding "velocity vector". The state equation is a uniform linear motion model with additive zero-mean Gaussian noise whose covariance is selected such that it describes the motion specific characteristics of the mobile device 102. The measurement model is the maximum likelihood position estimate, $\widehat{p_{ML}}(t)$, with additive zero-mean Gaussian noise whose covariance, $\widehat{\Sigma_{ML}}(t)$, is obtained from the curvature of the log-likelihood function.

Prior to performing the method, the position of the locator devices 104 and their orientations in the World frame 508 are determined and stored (e.g. $l_n$, $\Omega_n$, n=1, . . . , L). The functions determining the Kent parameters for each antenna, $f_e()$, are also determined and stored. Filter parameters for the outlier filter can also be determined and stored (e.g. state and measurement matrices for a Kalman filter). The outlier filter reset parameters can also be set (e.g. $d_{MAX}$, $T_{MAX}$ as described below). The measurement increment counter can also be set (e.g. t=0).

At operation 7.1, information indicative of a bearing from the antenna array of each of the one or more locator devices 104 to a mobile device 102 is received from one or more of the locator devices 104 in the same way as in operation 6.1 of FIG. 6.

At operation 7.2, parameters of a Kent distribution are determined for each of the one or more locator devices 104 based on the received information and predetermined characteristics of the antenna array of each of the locator devices 104 in the same way as in operation 6.2 of FIG. 6.

At operation 7.3, an initialisation point for the optimisation process is determined. If a previously estimated location of the mobile device 102 is available, this may be used to initialise the optimisation process. For example, a previous filtered estimated position may be used to initialise the optimisation process. Alternatively, a robust initialisation method can be used to calculate an initialisation position, $\widehat{p_0}(t)$, based on the received information indicative of a bearing from the antenna array of each of the one or more locator devices 104 to a mobile device 102. An iteration counter for the optimisation process, k, may also be set to zero.

The initialization point $\hat{p}_0(t)$ (at k=0) may be obtained by using an initial guess. Alternatively, a previous filtered position estimate can be used as an initialisation point. The quality of initialization can help to avoid local maxima caused by harsh indoor propagation conditions (e.g. multipath and non-line-of-sight). Therefore, the method can, in some examples, be applied in combination with an initialization method.

An example of an initialization method is an "Iterative Reweighted Least Squares" (IRLS) method. The IRLS method uses the information indicative of a bearing from the antenna array of each of the one or more locator devices to a mobile device to iteratively estimate the initialization point based on weights associated with each of the bearing measurements. A combined estimated position of the mobile device 102 is estimated based on the information indicative of a bearing using a set of weights, and an individual estimated position for each of the bearing measurements is determined. The individual estimated positions are compared with the combined estimated position to determine an error. Bearing measurements that result in an error above a threshold value are discarded, and the combined estimated position is re-estimated using the remaining bearing measurements. The process may be iterated until an initialisation threshold condition is met. Use of the IRLS method can increase the resilience of the method to multipath propagation, while also providing significant increases in the coverage area, while preserving the linear complexity property of the overall method.

At operation 7.4, the current gradient of the objective function is determined, and the value of the estimated position is updated. The value of $\nabla \mathcal{L}_\angle$ at the current estimated position, $\widehat{p_k}(t)$, is evaluated using Equation (7). An updated estimated position, $\widehat{p_{k+1}}$, is calculated using Equation 6. The iteration counter, k, is incremented by one.

At operation 7.5, one or more stopping criteria are checked. If the stopping criteria are not met, another iteration of operation 7.4 is performed. If a stopping criterion is met, the optimisation process terminates.

Stopping criteria may include one or more of: predefined a threshold number of iterations; a convergence criterion, for example that the objective function has been optimised to within a pre-determined threshold; the gradient of the objective function being less than a predefined value; and/or the change in the objective function between iterations falling below a threshold value.

At operation 7.6, a maximum likelihood estimated position is output and an error is calculated. The maximum likelihood estimated position is given by the value of the estimated position produced by the optimisation process:

$$\widehat{p_{ML}}(t) = \widehat{p_{k+1}}(t). \quad (8)$$

In some examples, in order to provide reliability information regarding the maximum likelihood position estimate to the final filtering stage, an estimated error may be calculated. In some examples, this can be in the form of a covariance matrix, $\widehat{\Sigma_{ML}}(t)$. The covariance matrix can be derived based on the local curvature of the log-likelihood function about the maximum likelihood solution. The curvature is given by a Hessian matrix, which contains the second order derivatives of $\mathcal{L}_\angle(p)$, and is computed as $$\nabla^2 \mathcal{L}_\angle(p) = \nabla[\nabla \mathcal{L}_\angle(p)]^T. \quad (9)$$

The covariance may be computed similarly to the Cramér-Rao lower bound, as the negative inverse of the Hessian, except instead of expected value over the measurements, the actual measurements are included. To deal with the case of singular (non-invertible) Hessian, the inverse can be computed via eigen-decomposition. If they are present, null eigenvalues can be replaced by some very small numbers to avoid numerical issues, e.g.

$$\widehat{\Sigma_{ML}} = -H^{-1} \quad (10)$$

where H is a "pseudo-Hessian", defined as $H = UDU^T$, with U being the matrix containing the eigenvectors of the true Hessian $\nabla^2 \mathcal{L}_\angle(p)$ evaluated at $\widehat{p_{ML}}$, and D being a diagonal matrix containing its eigenvalues, except that the zero eigenvalues are replaced by a small number. The covariance can be represented as an error ellipsoid in three dimensions, whose semi-axes directions are the columns of U, and whose squared lengths are the diagonal elements of D. Naturally, when a single locator is used, a three-dimensional position cannot be computed from direction only. In these cases, the Hessian becomes singular, and the variance along the axis of the fuzzy cone is infinite. Hence, eigenvalue replacement alleviates numerical issues.

As computation of the Hessian in Eq. (9) only involve inner products and scalar-vector multiplications, and Eq. (10) only requires the Eigen-decomposition of a 3×3 matrix, the computational complexity of the overall method remains linear in number of measurements.

At operation 7.7, outlier filtering is performed. Potential outlier estimated positions are detected and removed from the estimation based on the agreement between subsequent maximum likelihood estimated positions.

During the first pass through the method, when the increment measurement counter is equal to zero, a robust initial guess for the estimated position is determined, and the filtered estimated position, $\hat{p}_{KF}(t)$, is set to this value. The filtered estimated error is determined based on this initial estimated position (e.g. $\hat{p}_{KF}(t)=\hat{p}_{ML}(t)$, $\widehat{\Sigma_{KF}}(t)=\widehat{\Sigma_{ML}}(t)$.

During subsequent passes through the method, the current maximum likelihood estimated position, $\hat{p}_{ML}(t)$, is compared to the previous maximum likelihood estimated position $\hat{p}_{ML}(t-1)$. If the comparison satisfies a pre-defined condition, a robust initial guess for the position of the mobile device 102, $\widehat{p_0}(t)$, is re-determined and the filtered estimated position, $\hat{p}_{KF}(t)$, is set to this value. The filtered error estimate may also be re-initialised based on this estimated position.

The predefined condition may relate to a difference between the current maximum likelihood estimated position, $\hat{p}_{ML}(t)$, and the previous maximum likelihood estimated position $\hat{p}_{ML}(t-1)$. For example, if the magnitude of the difference between the current maximum likelihood estimated position and the previous maximum likelihood estimated position is greater than some pre-set threshold value, $d_{MAX}$, then the condition is satisfied, i.e. if:

$$\|\hat{p}_{ML}(t)-\hat{p}_{ML}(t-1)\|>d_{MAX}, \quad (9)$$

then the filtered estimated values are re-initialised.

Alternatively or additionally, if the waiting time T from the arrival of measurements relating to a particular mobile device 102 from the one or more locator devices 104 exceeds a predefined maximum time, i.e.

$$T>T_{MAX}, \quad (10)$$

then the filtered values of the estimated position and, in some examples, error are also re-initialised.

If the conditions that result in a re-initialisation of the filtered estimated position are not met, then a filtered estimate of the position of the mobile device 102 is calculated, $\hat{p}_{KF}(t)$. The filtered estimated position may be determined using a dynamic model of the mobile device position. Determining the filtered estimated position may comprise using the motion model of the mobile device 102, the current estimated position and at least one previous estimated position and/or filtered estimated position to form an estimate of the current mobile device 102 position. It may comprise the use of a data fusion algorithm.

As mentioned above, in some examples, Kalman filtering is used to determine the filtered estimated position, $\hat{p}_{KF}(t)$. A Kalman filter is a recursive filter that can estimate the position of the mobile device 102 using a sequence of noisy measurements of the mobile device 102 position. The inputs to the Kalman filter comprise the current estimated position, $\hat{p}_{ML}(t)$, a sequence of at least one previous estimated position, and an estimate of the error covariance, $\widehat{\Sigma_{ML}}(t)$.

The filtered estimated position is updated based on the results of the Kalman filtering. The corresponding estimated error, such as the posterior covariance matrix $\widehat{\Sigma_{KF}}(t)$, is also updated. In some examples, the initial guess of the estimated position at the next iteration of the method is set to be the updated filtered estimated position, i.e. $\hat{p}_0(t+1)=\hat{p}_{KF}(t)$. In this way, the computation of the initial guess is avoided in the normal operation mode.

At operation 7.8, the filtered position estimate is output. The filtered error estimate may also be output. The method returns to operation 7.1, and the increment measurement counter is increased (i.e. t:=t+1). The system them awaits additional measurements from the locator devices 104, whereupon the method is performed again.

Figure 8A:
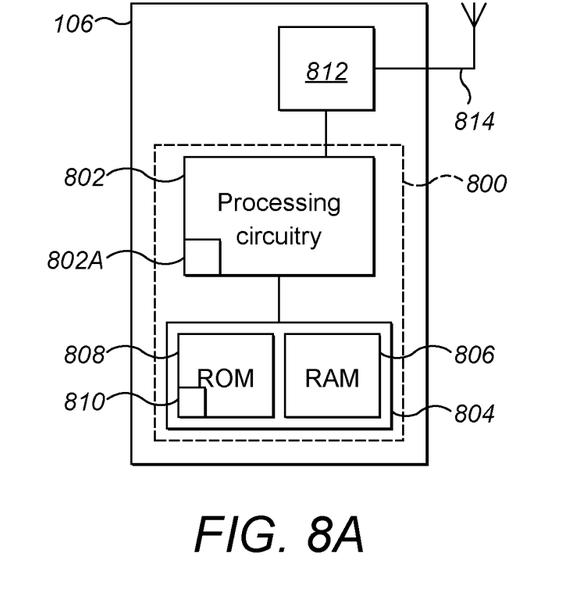
FIG. 8A shows an example configuration of a positioning server apparatus comprising a processing apparatus and memory.

FIG. 8A shows an example of a positioning server apparatus 106. The positioning server apparatus 106 may comprise control apparatus 800 (described in more detail below).

The positioning server apparatus 106 may further comprise communication means 812 for communicating with the one or more locator devices 104. Such communication means 812 may comprise a wired connection with one or more of the locator devices, such as an Ethernet connection, and/or wireless communication means, for example via an antenna 814.

Figure 8B:
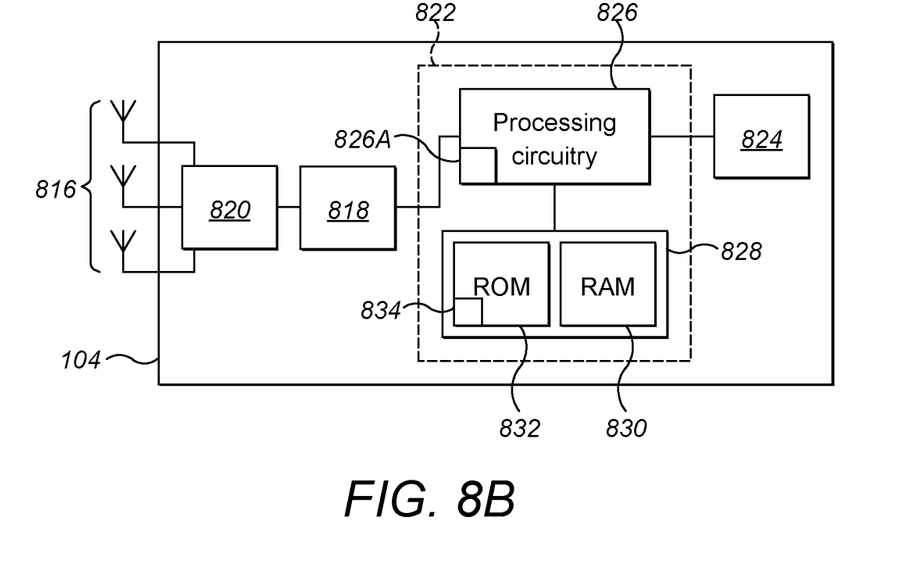
FIG. 8B shows an example configuration of a locator device.

FIG. 8B shows an example of a locator device 104. The locator devices 104 may be high-accuracy locator devices 104 which are configured to derive information or data from receipt of a certain type of packet (known as a positioning packet) which enables a bearing from the mobile device 102 to the locator device 104 to be determined. The high-accuracy locator devices 104 may include a phased array of antennas 802. The antennas of the array 816 are connected to transceiver circuitry 818 via a switch mechanism 820 which is configured to connect only one of the antennas to the transceiver circuitry 816 at any one time. The bearing to the mobile device 102 is determinable based on data derived from the receipt of a specific data portion of the positioning packet as the switch mechanism 820 sequentially connects a different one of the antennas to the transceiver circuitry 818. The data derived from the receipt of the data packet may, in some specific examples, include I and Q data. The locator device 104 further includes a controller 822 for controlling the other components of the device 104 in the manner discussed above and for providing various functionalities as discussed below. For instance, the controller 822 may cause data, derived from receipt of data packets from the mobile device 102, to be provided to the positioning server 106. The data is provided to the positioning server apparatus 106 via an I/O interface 824 which may be configured to transfer data using any suitable wired or wireless protocol.

The high-accuracy locator devices 106 may be referred to as HAIP (high accuracy indoor positioning) locator devices. HAIP as developed by Nokia is known in the art. Indeed, it is mentioned, and is described in various levels of detail, in (among other publications) the following published PCT patent applications, the contents of which are incorporated herein by reference in their entirety: WO 2014087196A, WO2013179195A, WO2014087198A, WO 2015013904A, WO 2014107869A, WO2014108753A, WO2014087199A and WO 2014087197A. In view of these and other disclosures, the fundamental principles utilised by the mobile device 102, locator devices 104 and the positioning server apparatus 106 to provide high accuracy positioning are not described in further detail in this specification.

Figure 8C:
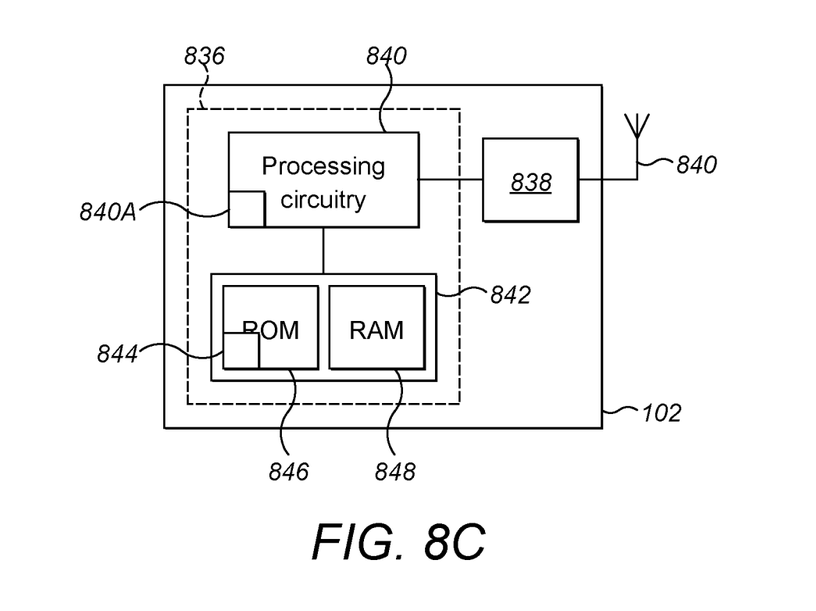
FIG. 8C shows an example configuration of a trackable device.

FIG. 8C shows an example of a mobile/trackable device 102. The one or more mobile devices 102 may be electronic tags or a more complex device such as a personal computing/communications device (such as, but not limited to, a mobile phone, a tablet computer or a wearable computing device such as a smart watch). The one or more mobile devices 102 may be of various different types, with some or all of the devices 102 providing the functionality described herein. The mobile/trackable device 102 comprises at least a controller 836 and transceiver circuitry 838. The controller 836 is configured to provide the functionality discussed herein and also to control the operation of transceiver circuitry 838 to transmit and receive packets via an antenna 840. The mobile devices 102 may be associated with an asset (e.g. carried by a user or attached to an object).

The mobile devices 102, the locator devices 104 and the positioning server apparatus 106 may be configured to communicate using any suitable wireless transmission protocol. In some specific examples, however, the transceivers 812, 818, 838 of the devices 102, 104, 106 may each be configured, under the control of respective controllers 800, 822, 836 to communicate via a Bluetooth transmission protocol. For instance, the transceivers 812, 818, 838 may be configured to transmit and/or receive data packets (including data packets for enabling position determination and timing control packets) using a Bluetooth Low Energy protocol, as described in or compatible with the current version of the Core Bluetooth specification (Version 5.0). In other examples, however, at least some of the devices 102, 104, 106 may also or additionally be configured to communicate using another suitable protocol. Such protocols may include but are not limited to 802.11 wireless local area network protocols, other types of Bluetooth protocol or IEEE 802.15.4 protocols.

As will be appreciated, the apparatus 102, 104, 106 and associated apparatuses illustratively depicted in FIGS. 8A-C may comprise further components which may or may not be directly involved with processes and operations in respect of which this application is focused.

Some further details of components and features of the above-described apparatus 102, 104, 106 and alternatives for them will now be described.

The control apparatus 800, 822, 836 described above may comprise processing apparatus 802, 826, 840 communicatively coupled with memory 804, 828, 842. The memory 804, 828, 842 has computer readable instructions 810, 834, 844 stored thereon which, when executed by the processing apparatus 802, 826, 840 causes the control apparatus 800, 822, 836 to cause performance of various ones of the operations described with reference to FIGS. 1 to 7. The control apparatus 800, 822, 836 may, in some instances, be referred to as simply "apparatus".

The processing apparatus 802, 826, 840 may be of any suitable composition and may include one or more processors 802A, 826A, 840A of any suitable type or suitable combination of types. Indeed, the term "processing apparatus" should be understood to encompass computers having differing architectures such as single/multi-processor architectures and sequencers/parallel architectures. For example, the processing apparatus 802, 826, 840 may be a programmable processor that interprets computer program instructions 810, 834, 844 and processes data. The processing apparatus 802, 826, 840 may include plural programmable processors. Alternatively, the processing apparatus 802, 826, 840 may be, for example, programmable hardware with embedded firmware. The processing apparatus 802, 826, 840 may alternatively or additionally include one or more specialised circuit such as field programmable gate arrays FPGA, Application Specific Integrated Circuits (ASICs), signal processing devices etc. In some instances, processing apparatus 802, 826, 840 may be referred to as computing apparatus or processing means.

The processing apparatus 802, 826, 840 is coupled to the memory 804, 828, 842 and is operable to read/write data to/from the memory 804, 828, 842. The memory 804, 828, 842 may comprise a single memory unit or a plurality of memory units, upon which the computer readable instructions (or code) 810, 834, 844 is stored. For example, the memory 804, 828, 842 may comprise both volatile memory 806, 830, 848 and non-volatile memory 808, 834, 846. In such examples, the computer readable instructions/program code 810, 834, 844 may be stored in the non-volatile memory 808, 834, 846 and may be executed by the processing apparatus 802, 826, 840 using the volatile memory 806, 830, 848 for temporary storage of data or data and instructions. Examples of volatile memory include RAM, DRAM, and SDRAM etc. Examples of non-volatile memory include ROM, PROM, EEPROM, flash memory, optical storage, magnetic storage, etc.

The memory 804, 828, 842 may be referred to as one or more non-transitory computer readable memory medium or one or more storage devices. Further, the term 'memory', in addition to covering memory comprising both one or more non-volatile memory and one or more volatile memory, may also cover one or more volatile memories only, one or more non-volatile memories only. In the context of this document, a "memory" or "computer-readable medium" may be any media or means that can contain, store, communicate, propagate or transport the instructions for use by or in connection with an instruction execution system, apparatus, or device, such as a computer.

The computer readable instructions/program code 810, 834, 844 may be pre-programmed into the control apparatus 800, 822, 836. Alternatively, the computer readable instructions 810, 834, 844 may arrive at the control apparatus 800, 822, 836 via an electromagnetic carrier signal or may be copied from a physical entity such as a computer program product, a memory device or a record medium such as a CD-ROM or DVD. The computer readable instructions 810, 834, 844 may provide the logic and routines that enables the apparatus 102, 104, 106 to perform the functionality described herein. The combination of computer-readable instructions stored on memory (of any of the types described above) may be referred to as a computer program product. In general, references to computer program, instructions, code etc. should be understood to express software for a programmable processor firmware such as the programmable content of a hardware device as instructions for a processor or configured or configuration settings for a fixed function device, gate array, programmable logic device, etc.

The control apparatus 800, 822, 836 may, in some example implementations, be referred to as control circuitry. As used in this application, the term "circuitry" may refer to one or more or all of the following:

(a) hardware-only circuit implementations (such as implementations in only analog and/or digital circuitry) and (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a based station, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Figure 9:
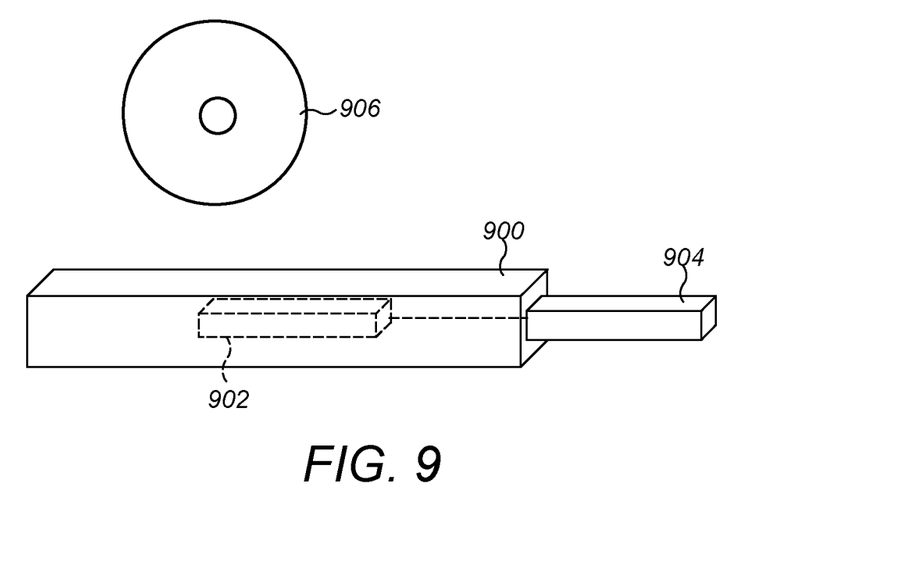
FIG. 9 shows examples of non-transitory computer-readable media.

FIG. 9 shows examples of computer readable media/computer program products 900, 906. In some examples, the computer readable medium 900 is in the form of a portable memory device (such as a "memory stick"). In some examples, the computer readable medium comprises a computer readable disk 906, such as a CD-ROM or DVD. Many other examples are possible. The computer program product 800 comprises a memory 802 containing computer readable instructions that may provide the logic and routines that enables a computing apparatus to perform the functionality described herein. It may also comprise an interface 904, such as a USB interface for example, for communicating with the computing apparatus.

Although various aspects of the methods and apparatuses described herein are set out in the independent claims, other aspects may comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims. The extent of protection is defined by the following claims, with due account being taken of any element which is equivalent to an element specified in the claims.

The invention claimed is:

1. An apparatus comprising:
at least one processor and
at least one memory including computer program code, the at least one memory and the computer program configured, with the at least one processor, to cause the apparatus at least to
receive, from a plurality of locator devices, wherein respective ones of the plurality of locator devices comprise an antenna array, information indicative of at least one bearing from the antenna arrays of the respective ones of the plurality of locator devices to a mobile device;
determine parameters of a Kent distribution for the respective ones of the plurality of locator devices based on the received information and at least one predetermined characteristic of respective ones of the antenna arrays;
determine an estimated position of the mobile device, comprising performing a search process on a function dependent on the Kent distribution parameters for the respective ones of the plurality of locator devices; and
provide the estimated position of the mobile device for use with a client tool.

2. The apparatus of claim 1, further configured to determine an initial estimated position of the mobile device using an iterative reweighted least squares method to initialise the search process performed on the function, wherein the function comprises a likelihood function.

3. The apparatus of claim 1, wherein a previous estimated position of the mobile device is used to initialise the search process performed on the function.

4. The apparatus of claim 1, wherein the search process comprises optimising the function to be within a predetermined threshold.

5. The apparatus of claim 1, wherein the search process comprises performing one or more of: a gradient search process or grid search process on the function.

6. The apparatus of claim 1, wherein the at least one predetermined characteristic describes an aperture size of respective ones of the antenna arrays.

7. The apparatus of claim 1, further configured to determine an estimated error for the estimated position of the mobile device, wherein the estimated error is determined based on a local curvature of the function.

8. The apparatus of claim 1, further configured to perform outlier filtering on the estimated position of the mobile device to determine a filtered estimated position of the mobile device.

9. The apparatus of claim 8, wherein performing outlier filtering further comprises the apparatus being configured to:
determine whether a difference between the estimated position of the mobile device and a previous estimated position of the mobile device is below a threshold distance; and
set the filtered estimated position using Bayesian filtering in response to a positive determination.

10. The apparatus of claim 9, wherein performing outlier filtering further comprises the apparatus being configured to:
in response to a negative determination, re-compute an initial estimated position of the mobile device and setting set the filtered estimated position of the mobile device to the initial estimated position of the mobile device.

11. The apparatus of claim 1, wherein the function comprises a joint likelihood function, a log-likelihood function, or an a posteriori probability density function of the Kent distribution for respective ones of the plurality of locator devices.

12. The apparatus of claim 1, wherein the received information comprises a unit vector directed from respective ones of the plurality of locator devices to the mobile device.

13. A method comprising:
receiving, from a plurality of locator devices, wherein respective ones of the plurality of locator devices comprise an antenna array, information indicative of at least one bearing from the antenna arrays of the respective ones of the plurality of locator devices to a mobile device;
determining parameters of a Kent distribution for the respective ones of the plurality of locator devices based on the received information and at least one predetermined characteristic of respective ones of the antenna arrays;
determining an estimated position of the mobile device, comprising performing, a search process on a function dependent on the Kent distribution parameters for the respective ones of the plurality of locator devices; and
providing the estimated position of the mobile device for use with a client tool.

14. The method of claim 13, further comprising determining an initial estimated position of the mobile device using an iterative reweighted least squares method to initialise the search process performed on the function, wherein the function comprises a likelihood function.

15. The method of claim 13, wherein a previous estimated position of the mobile device is used to initialise the search process performed on the function.

16. The method of any of claim 13, wherein the search process comprises optimising the function to be within a predetermined threshold.

17. The method of any of claim 13, wherein the search process comprises performing one or more of: a gradient search process, or a grid search process on the function.

18. A non-transitory computer readable medium comprising program instructions for causing at least one processor to perform at least the following:
- receiving, from a plurality of locator devices, wherein respective ones of the plurality of locator devices comprise an antenna array, information indicative of at least one bearing from the antenna arrays of the respective ones of the plurality of locator devices to a mobile device;
- determining parameters of a Kent distribution for the respective ones of the plurality of locator devices based on the received information and at least one predetermined characteristic of the antenna arrays;
- determining an estimated position of the mobile device, comprising performing a search process on a function dependent on the Kent distribution parameters for the respective ones of the plurality of locator devices; and
- providing the estimated position of the mobile device for use with a client tool.

* * * * *